United States Patent
Kurohata

(10) Patent No.: US 6,547,684 B2
(45) Date of Patent: Apr. 15, 2003

(54) RATCHET TENSIONER WITH PLUNGER RELEASING MECHANISM

(75) Inventor: Junya Kurohata, Osaka (JP)

(73) Assignee: Tsubakimoto Chain Co., Osaka (JP)

(*) Notice: Subject to any disclaimer, the term of this patent is extended or adjusted under 35 U.S.C. 154(b) by 0 days.

(21) Appl. No.: 09/898,377

(22) Filed: Jul. 3, 2001

(65) Prior Publication Data

US 2002/0006840 A1 Jan. 17, 2002

(30) Foreign Application Priority Data

Jul. 3, 2000 (JP) .................................... 2000/201017

(51) Int. Cl.⁷ ................................................ F16H 7/08
(52) U.S. Cl. ...................... 474/111; 474/109; 74/577 R
(58) Field of Search ................................ 474/101, 109, 474/110, 111, 140, 136, 138; 74/577, 577 S, 577 R, 577 SF, 577 M, 535, 537, 538

(56) References Cited

U.S. PATENT DOCUMENTS

| 4,881,927 A | * | 11/1989 | Suzuki | ........................ 474/110 |
| 5,030,169 A | * | 7/1991 | Kiso et al. | .................. 474/110 |
| 5,908,363 A | * | 6/1999 | Suzuki | ........................ 474/101 |
| 6,059,678 A | * | 5/2000 | Suzuki | ........................ 474/101 |
| 6,454,672 B2 | * | 9/2002 | Kurohata | ..................... 474/111 |
| 2001/0009876 A1 | * | 7/2001 | Kurohata | ..................... 474/110 |
| 2001/0009877 A1 | * | 7/2001 | Kurohata | ..................... 474/110 |

FOREIGN PATENT DOCUMENTS

| JP | 01-12165 | 1/1989 |
| JP | HEI-10-2386 | 1/1998 |
| JP | HEI 11-344086 | 12/1999 |

\* cited by examiner

*Primary Examiner*—David A. Bucci
*Assistant Examiner*—Timothy McAnulty
(74) *Attorney, Agent, or Firm*—Dann, Dorfman, Herrell and Skillman; Henry H. Skillman

(57) ABSTRACT

A ratchet tensioner includes a plunger releasing mechanism for turning a ratchet pawl against the force of a plunger spring to disengage a locking prong of the ratchet pawl from a rack tooth of a plunger. The plunger releasing mechanism has a pin insertion hole formed in a plunger housing transversely across a recessed groove formed in the housing for mounting the ratchet pawl, and a sloped surface formed on the ratchet pawl and normally extending obliquely across the axis of the pin insertion hole. The sloped surface, upon abutment with the tip end of a pin which is inserted in the pin insertion hole, is capable of causing the ratchet pawl to turn against the force of the ratchet spring to thereby disengage the locking prong of the ratchet pawl from the rack tooth of the plunger for releasing the plunger.

6 Claims, 7 Drawing Sheets

RATCHET TENSIONER WITH PLUNGER RELEASING MECHANISM

BACKGROUND OF THE INVENTION

1. Field of the Invention

The present invention relates generally to a ratchet tensioner used for applying an appropriate tension to a timing belt or a timing chain of a vehicle engine, and more particularly to a ratchet tensioner equipped with a plunger releasing mechanism operative to turn a ratchet pawl in a direction to disengage a locking pawl of the ratchet pawl from rack teeth formed on a plunger.

2. Description of the Related Art

In a drive system having a timing belt or chain stretched for power transmission between an engine crankshaft and a camshaft, a ratchet tensioner is widely used for suppressing vibration generated during travel of the timing belt or chain as well as for maintaining a proper tension in the timing belt or chain. The ratchet tensioner has a spring-loaded plunger projecting outward from a tensioner housing to urge a back surface in the vicinity of the distal or free end of a tensioner lever in a direction, so that a shoe surface of the tensioner lever is held in slide contact with the slack side of a timing chain to thereby apply a tension to the timing chain. Prior examples of the ratchet tensioner are disclosed in Japanese Patent Publication No. HEI-3-8414 and Japanese Patent Laid-open Publication Nos. HEI-10-2386 and HEI-11-344086.

FIGS. 13 and 14 hereof illustrate a typical example of the conventional ratchet tensioner. This tensioner 31 includes a plunger 33 slidaby received in a plunger accommodating hole (not designated) of the housing 32 with its outer end 33A (FIG. 13) projecting outward from a front surface of the housing 32 by the force of a plunger spring 36 (FIG. 14) received inside the housing 32, and a ratchet pawl 34 pivotally mounted by a pivot shaft or pin 34A to the housing 32. The ratchet pawl 34 is accommodated in a cutout recess or groove 32E defined by two opposed side walls 32C, 32D. The ratchet pawl 34 is urged by a ratchet spring 38 to turn about the pivot pin 34A in one direction to keep meshing engagement between a locking prong 34B (FIG. 14) and one of a series of rack teeth 33B formed on an outer circumferential surface of the plunger along the axis thereof, so that the plunger 33 is prevented from moving backward.

The illustrated ratchet tensioner 31 has a built-in hydraulic shock absorbing mechanism using the flow resistance of oil. The rack teeth 33B and the locking prong 34B are designed to provide a backlash therebetween. The oil (not shown) supplied from an external oil pump operating in synchronism with an engine is introduced into a hollow interior space (not designated) of the plunger 33 via a check valve mechanism 35 provided at the bottom of the plunger accommodating hole of the housing 32. When the plunger 33 is subjected to a shock or impact force from a tensioner lever (now shown), the plunger 33 moves backward within the range of the backlash against the force of the plunger spring 36 while the prong 34B and the rack teeth 33B are kept in mesh with each other. In his instance, the check valve mechanism 35 is closed so that the oil within the hollow interior space of the plunger 33 is forced to leak out from a clearance between the outer circumferential surface of the plunger 33 and an inner peripheral surface of the plunger accommodating hole of the housing 32 to thereby absorb the impact force. Reference character 32B shown in FIGS. 13 and 14 denotes holes used for mounting the ratchet tensioner 31 to the engine body.

The ratchet tensioner 31 further has a lever 37 (FIG. 13) firmly connected at one end to an end of the pivot pin 34A and projecting outward from the housing 32. By turning the lever 37, the ratchet pawl 34 is turned about the pivot pin 34A in the direction of arrows shown in FIGS. 13 and 14 with the result the engagement between the ratchet prong 34B and the rack teeth 33B is released.

When the engine is to be repaired or when the chain is to be removed, the plunger 33 of the ratchet tensioner needs to be displaced in a fully retracted position. In the conventional ratchet tensioner 31, the plunger 33, which is operating as a one-way mechanism, can be released by turning the ratchet pawl 34 in the direction of arrows against the force of the ratchet spring 38. However, the conventional ratchet tensioner 31 has no means or mechanism for maintaining the plunger 33 in the released state. It is, therefore, difficult to keep the locking prong 34B of the ratchet pawl 34 separated from the rack teeth 33B of the plunger 33. This makes it difficult to achieve the chain replacement operation with ease. In addition, the lever 37 cannot be easily turned or manipulated by a screwdriver which is inserted in a hole 37A in the lever 37 through a small service hole provided in the engine. Even when the lever 37 is turned by using such screwdriver, a difficulty still arise in maintaining the lever in an angularly displaced condition. As a consequence, it is practically impossible for the plunger 33 to be maintained in a released condition with the locking prong 34B disengaged from the rack teeth 33B. Another problem is that the lever 37 attached as a separate part to the pivot shaft 34A of the ratchet pawl 34 increases the number of part of the tensioner 31, which will incur an additional cost.

SUMMARY OF THE INVENTION

Accordingly, a general object of the present invention is to solve the aforementioned problems associated with the conventional ratchet tensioners.

A more specific object of the present invention is to provide a ratchet tensioner having a plunger releasing mechanism which can readily turn a ratchet pawl against the force of a ratchet spring in a direction to disengage prongs of ratchet pawl from rack teeth on a plunger, thereby keeping the plunger in a released condition.

To achieve the objects, according to the present invention, there is provided a ratchet tensioner comprising: a housing; a plunger reciprocally mounted in the housing and urged by a plunger spring received inside the housing so that one end of the plunger projects outward from the housing; a ratchet pawl pivotally mounted by a pivot shaft to the housing within a recessed groove formed in the housing, the ratchet pawl having a locking prong at one end thereof located on one side of the pivot shaft; and a ratchet spring urging the ratchet pawl to turn about the axis of the pivot shaft in one direction so that the locking prong of the ratchet pawl is held in mesh with one of a series of rack teeth 3B formed on an outer circumferential surface of the plunger along the axis thereof. The ratchet tensioner further includes a plunger releasing mechanism for turning the ratchet pawl about the axis of the ratchet shaft in the opposite direction against the force of the plunger spring to disengage the locking prong of the ratchet pawl from the rack tooth of the plunger. The plunger releasing mechanism has a pin insertion hole formed in the housing transversely across the recessed groove for permitting insertion of a pin from the exterior of the housing, the pin insertion hole being located on the opposite side from the locking prong with respect to the pivot shaft, and a sloped surface formed on the ratchet pawl and normally extending obliquely across the axis of the pin insertion hole. The sloped surface, upon abutment with a tip end of the pin which is inserted in the pin insertion hole, is capable of causing the ratchet pawl to turn in the opposite direction against the force of the ratchet spring to thereby disengage the locking prong of the ratchet pawl from the rack tooth of the plunger for releasing the plunger.

In one preferred form of the present invention, the ratchet pawl has a pin accommodating hole formed therein with the axis normally offset from the axis of the pin insertion hole of the housing. The pin accommodating hole has an inner circumferential surface portion extending at an angle to the axis of the pin accommodating hole and forming the sloped surface.

The pin insertion hole is open at least at one end thereof. The pin accommodating hole may comprise a tapered hole having a larger end facing in the same direction as the open end of the pin insertion hole and a smaller end opposite to the larger end. The larger end of the tapered hole has an oblong shape, and the smaller end of the tapered hole has a circular shape, the oblong-shaped larger end of the tapered hole and the circular-shaped smaller end of the tapered hole being connected by the sloped surface. As an alternative, the larger end of the tapered hole has an oblong shape and an inner circumferential surface extending parallel to the axis of the tapered hole, and the smaller end of the tapered hole has a circular shape and an inner circumferential surface extending parallel to the axis of the tapered hole. The sloped surface is formed by a portion of an inner circumferential surface of an intermediate portion disposed between the oblong-shaped larger end of the tapered hole and the circular-shaped smaller end of the tapered hole. The pin accommodating hole may be a circular hole with countersink having a larger end facing in the same direction as the open end of the pin insertion hole and a smaller end opposite to the larger end. The countersink has an inner circumferential surface partly forming the sloped surface.

In another preferred form of the present invention, the ratchet pawl is beveled at an edge so as to form the sloped surface.

When the pin is inserted in the pin insertion hole, a tip end of the pin engages the sloped surface of the racket pawl. As the insertion pin further advances, the tip end of the pin forces the sloped surfaces in the forward direction. By virtue of a horizontal component of the pressure or force applied from the pin to the sloped surface, the ratchet pawl is turned about the pivot shaft in the opposite direction against the force of the ratchet pawl to disengage the locking prong of the ratchet pawl from the rack tooth on the plunger. The plunger is thus released. When the pin is fully inserted in the pin insertion hole across the recessed groove, the ratchet pawl is held in a releasing position in which the locking prong is disengaged from the rack tooth of the plunger and thus allows the plunger project by the force of the plunger spring or to be manually displaced backward in a fully retracted position.

BRIEF DESCRIPTION OF THE DRAWINGS

The above and other objects, features and advantages of the present invention will be better understood from the following description taken in conjunction with the accompanying drawings, in which.

DETAILED DESCRIPTION OF THE PREFERRED EMBODIMENTS

Figure 1:
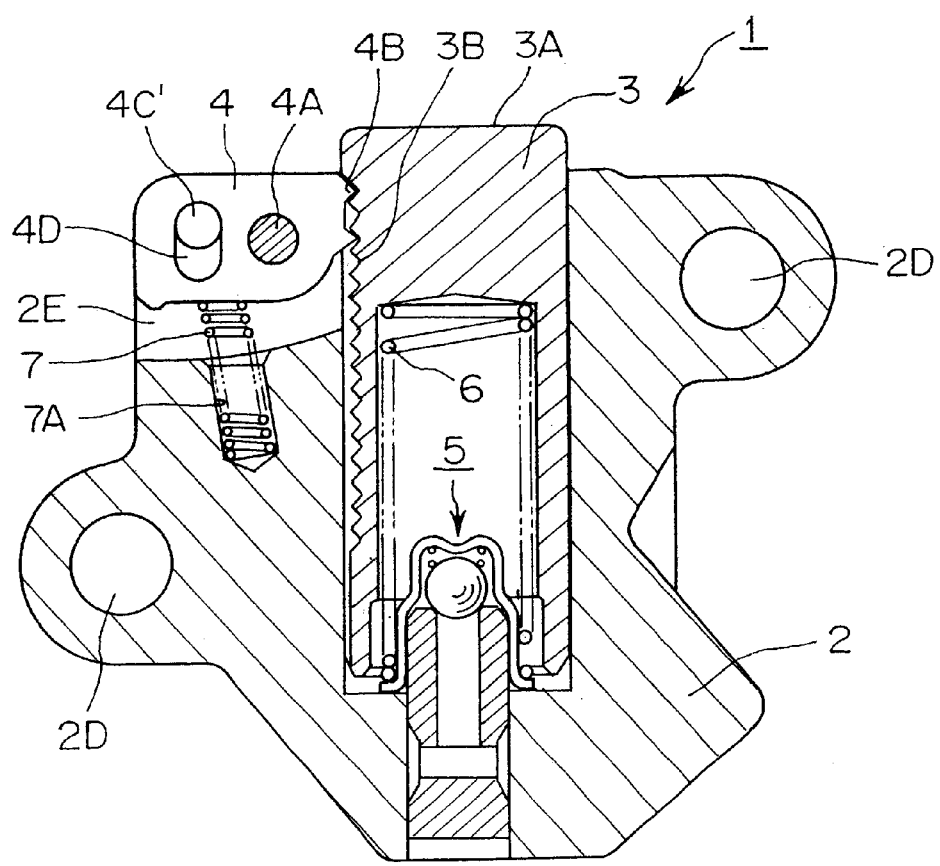
FIG. 1 is a cross-sectional view of a ratchet tensioner according to a first embodiment of the present invention.

Certain preferred embodiments of the present invention will be described with reference to the accompanying sheets of drawing. FIGS. 1 to 6 show a ratchet tensioner 1 according to a first embodiment of the present invention. The tensioner 1 includes a housing 2, a plunger 3 reciprocally mounted in the housing 2 and urged by a plunger spring 6 disposed inside the housing 2 so that one end (front end) 3A of the plunger 3 projects outward from the housing 2, and a ratchet pawl 4 pivotally mounted by a pivot shaft 4 to the housing 2 within a recessed groove 2E formed in the housing 2. The ratchet pawl 3 is urged by a ratchet spring 7 to turn about the axis of the pivot shaft 4A in a direction so that a locking prong 4B formed on a front end of the ratchet pawl 4 is held in mesh with one tooth of a series of rack teeth 3B formed on an outer circumference surface of the plunger 3 along the axis thereof to thereby prevent retracting or backward movement of the plunger 3 from moving backward. The ratchet spring 7 has one end portion received in a spring retaining hole 7A (FIG. 1) formed in the housing 2.

The ratchet tensioner 1 has a built-in hydraulic shock absorbing mechanism. The rack teeth 3B and the locking prong 4B are designed to provide a backlash therebetween. Though not shown, an oil supplied from an external pump (not shown) is introduced into a hollow interior space (not designated) of the plunger 3 via a check valve mechanism 5 provided at the bottom of a plunger accommodating hole or bore (not designated) formed in the housing 2. When the plunger 3 is subjected to a shock or impact force applied from a tensioner lever (not shown), the plunger 3 moves backward within the range of the backlash against the force of the plunger spring 6 while the locking prong 4B is held in mesh with one rack tooth 3B. In this instance, the check valve mechanism 5 is closed so that the oil inside the plunger 3 is forced to leak out from a clearance between the outer circumferential surface of the plunger 3 and an inner circumferential surface of the plunger accommodating bore, thereby absorbing the impact force.

Figure 3A:
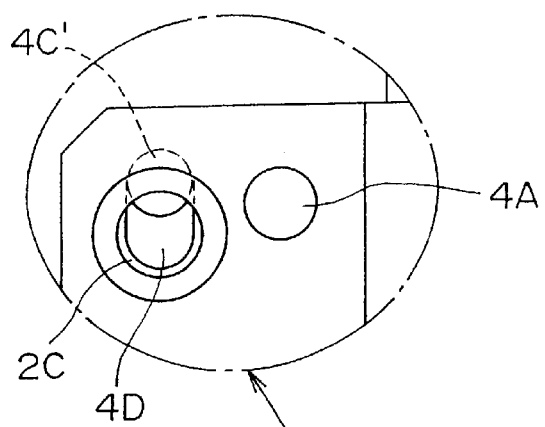
FIG. 3A is an enlarged view of a portion of FIG. 3.
Figure 3:
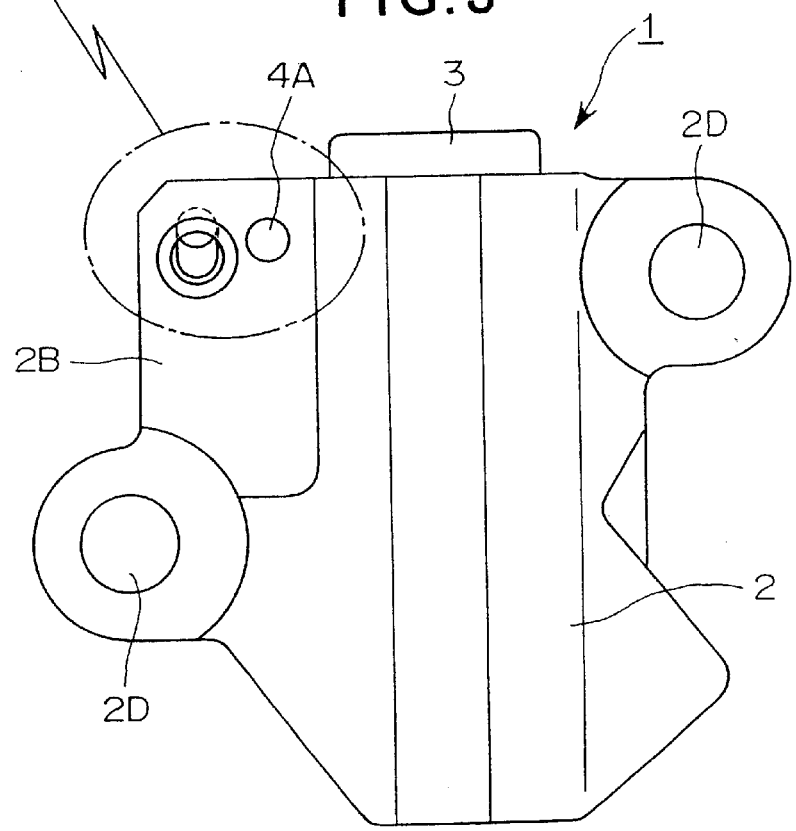
FIG. 3 is a plan view of the ratchet tensioner.
Figure 4:
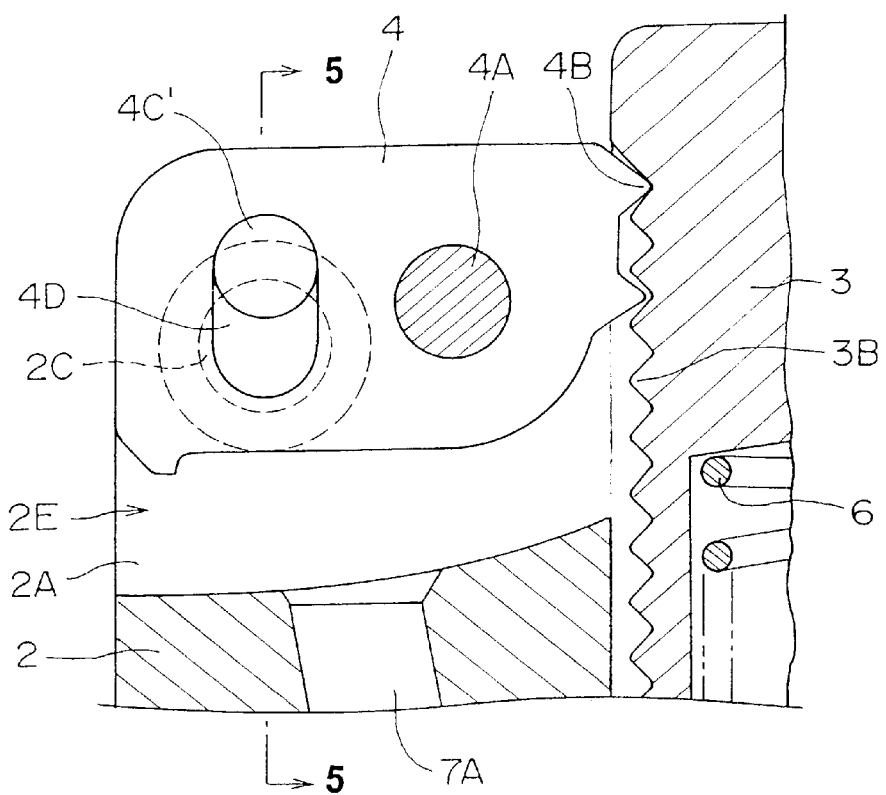
FIG. 4 is an enlarged view of a portion of FIG. 1, showing a ratchet pawl and related parts thereof while the tensioner is in operation.

FIGS. 1 and 4 show the ratchet tensioner 1 while in operation. In FIG. 4, the ratchet spring 7 is omitted. When a belt or a chain (not shown) becomes loose or slack due to elongation caused during operation, the plunger 3 moves forward by the force of the plunger spring 6 and the oil is supplied from the external pump into the hollow interior space of the plunger 3. This causes the locking prong 4B of the ratchet pawl 4 to shaft engagement with the rack teeth 3B by one tooth pitch, thereby taking up the slack of the belt or chain. Thus, the plunger 3 operates as a one-way mechanism moving in one direction projecting outward of the housing 2. In FIGS. 1 and 3, reference numeral 2D denotes mounting holes used for mounting the ratchet tensioner 1 to the engine body.

The ratchet tensioner 1 further has a plunger releasing mechanism which is generally comprised of a pin insertion hole 2C formed in the housing 2, and a sloped surface 4D formed on the ratchet pawl 4, the sloped surface 4D extending obliquely across the axis of the pin insertion hole 2C.

Figure 2:
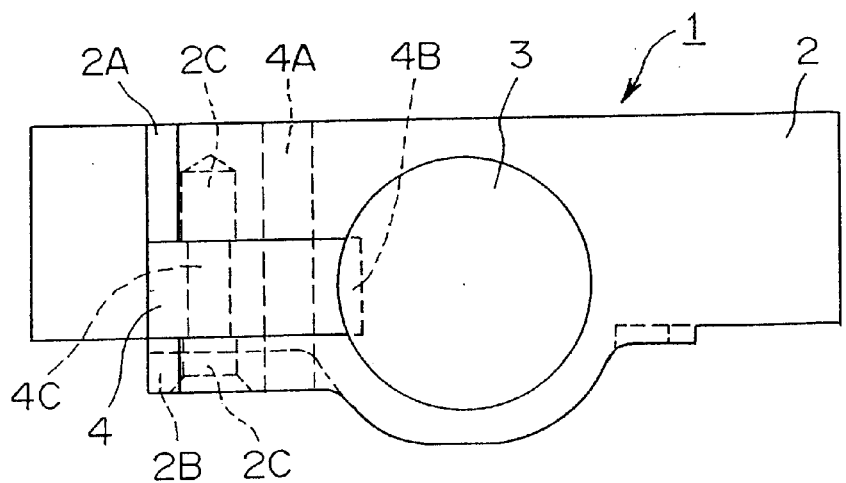
FIG. 2 is a front elevational view of the ratchet tensioner.
Figure 5:
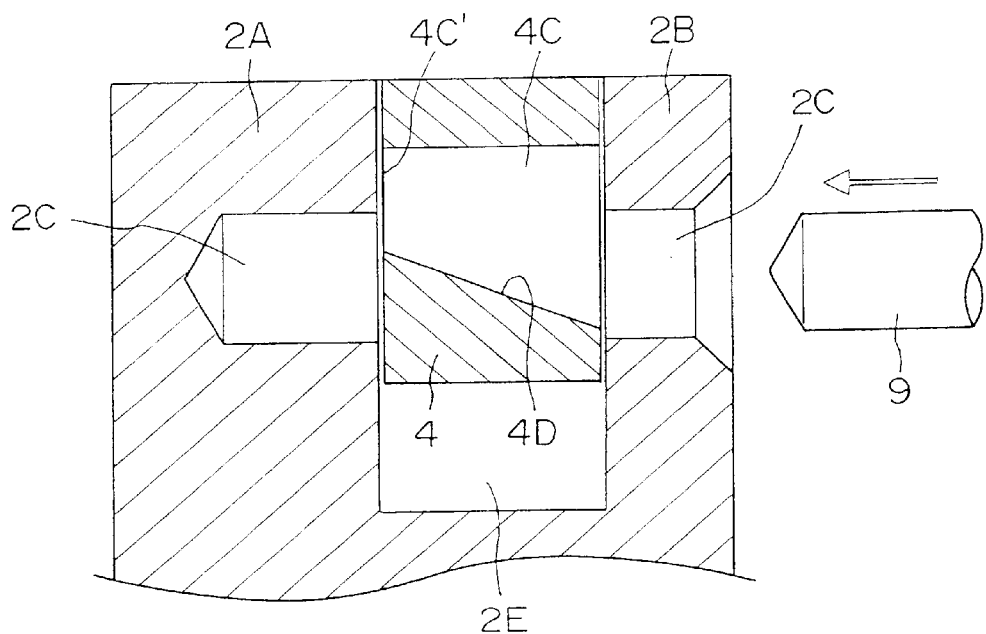
FIG. 5 is a cross-sectional view taken along line V—V of FIG. 4.

The housing 2 is formed with the recessed groove 2E for receiving therein the ratchet pawl 4. The recessed groove 2E is defined between two opposed side walls 2A and 2B (FIG. 2). The side walls 2A, 2B supports opposite ends of the pivot shaft 4A, and the ratchet pawl 4 rotatably mounted on the pivot shaft 4A. The pin insertion hole 2C is formed in the housing 2 transversely across the recessed groove 2E and is located at the opposite side from the locking prong 4B of the racket pawl 4 with respect to the pivot shaft 4A. The pin insertion hole 2C may be a circular hole or a rectangular hole. The shape of the pin insertion hole 2C is not essential to the invention. The pin insertion hole 2C is open at least at one end to an outside surface of the housing 2 for permitting insertion of a pin 9 (FIG. 5) into the pin insertion hole 2C. As shown in FIGS. 2 and 5, a first portion of the pin insertion hole 2C, which is formed in the side wall 2B, extends through the thickness of the side wall 2B, while a second portion of the pin insertion hole 2C, which is formed in the side wall 2A, does not extend through the thickness of the side wall 2A. In the illustrated embodiment, the second portion of the pin insertion hole 2C serves to receive a tip end of the pin 9 and the second pin insertion hole portion may extend through the side wall 2A. The second pin insertion hole portion may be omitted as the case may be.

The ratchet pawl 4 has a pin accommodating hole 4C formed on the opposite side from the locking prong 4B with respect to the pivot shaft 4A. The pin accommodating hole 4C communicates with the pin insertion hole 2C formed in the housing 2 is normally offset from the pin insertion hole 2C. As shown in FIGS. 4 and 5, the pin accommodating hole 4C is a tapered hole having a larger end facing the side wall 2B and a smaller end 4C' facing the side wall 2A. The larger end of the tapered hole 4C has an oblong shape, and the smaller end 4C' of the tapered hole 4C has a circular shape. The tapered hole 4C has a first arcuate surface extending parallel to the axis of the pin insertion hole 2C, a second arcuate surface 4D extending obliquely across the axis of the pin insertion hole 2C at the opposite side of the first arcuate surface, and two opposed flat surfaces each connecting two adjacent ends of the first and second arcuate surfaces. The second arcuate surface 4D forms a sloped surface.

The ratchet tensioner 1 equipped with the plunger releasing mechanism operates as follows.

As shown in FIG. 5, a pin 9 is inserted into the pin insertion hole 2C from the first portion formed in the side wall 2B. As the pin 9 advances, a conical tip end of the pin 9 engages the sloped surface 4D of the ratchet pawl 4, then forcing the sloped surface 4D forward (left-hand direction in FIG. 5). In this instance, by virtue of a horizontal component of the pressure or force applied from the pin 9 to the sloped surface 4D, the ratchet pawl 4 is turned counterclockwise in FIG. 4 about the pivot shaft 4A against the force of the ratchet spring 7. As the pin 9 further advances, the sloped surface 4D slides on the tip end of the pin 9 to thereby continue counterclockwise movement of the ratchet pawl 4. The clockwise movement of the ratchet pawl 4 terminates when the tip end of the pin 9 is received in the second pin insertion hole portion formed in the side wall 2A. In the case where the ratchet tensioner 1 is assembled in the engine and lubricated together with other movable parts of the engine, sliding movement between the sloped surface 4D of the ratchet pawl 4 and the tip end of the pin 9 occurs smoothly.

Figure 6:
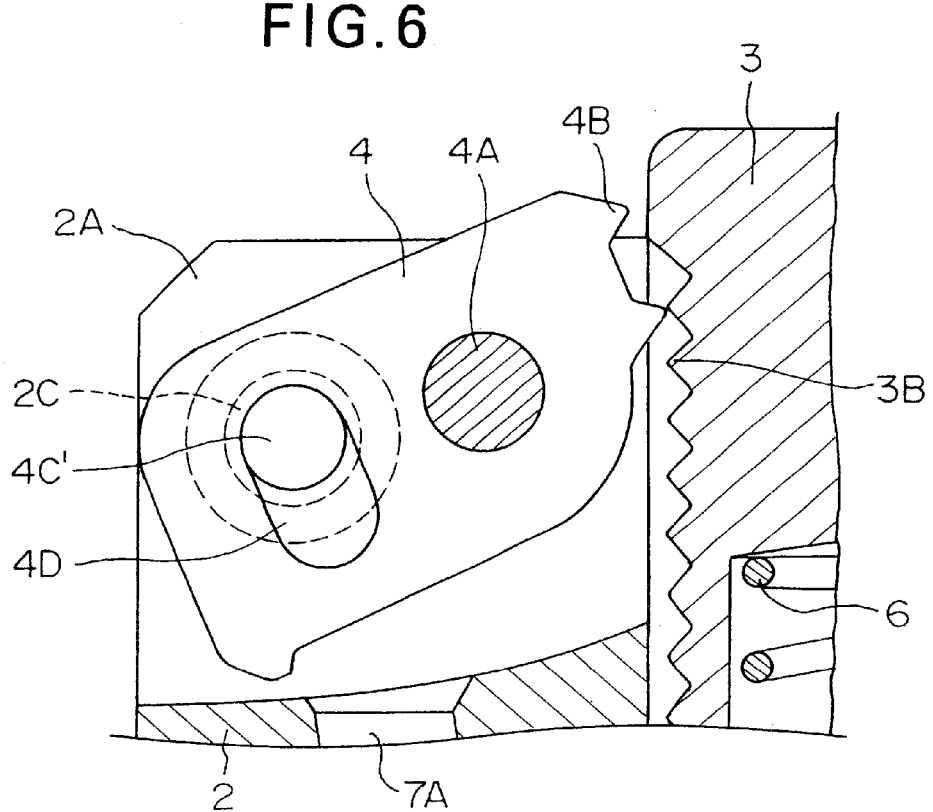
FIG. 6 is a view similar to FIG. 4, but showing the ratchet pawl in its released or disengaged position.

By thus turning the ratchet pawl 4, the locking prong 4B of the ratchet pawl 4 is disengaged from the rack tooth 3B of the plunger 3, as shown in FIG. 6, so that the plunger 3 is released and can be displaced in a fully retracted position in preparation for the repair of the engine or replacement of the belt or chain. While the pin 9 is inserted in the pin insertion hole 2C of the housing 2 across the pin accommodation hole 4C of the ratchet pawl 4, the plunger 3 is held in a released condition.

As described above, in the ratchet tensioner 1 equipped with the plunger releasing mechanism, only by inserting the pin 9 from the pin insertion hole 2C of the housing 2 into the pin accommodating hole 4C of the ratchet pawl 4, the meshing engagement between the locking pawl 4B of the ratchet pawl 4 and the rack teeth 3B of the plunger 3. Thus, the plunger 3 can be released easily and reliably. Additionally, the plunger 3 can be held in the released position by placing the pin 9 in its fully inserted position in which the pin 9 is received in the pin insertion hole 2C in the housing 2 transversely across the pin accommodating hole 4C of the ratchet pawl 4. The plunger 3, as it is in the released state, can be manually displaced in its fully retracted position, so that a work required for the repair of the engine or replacement of the belt or chain can be achieved smoothly and reliably.

Figure 7:
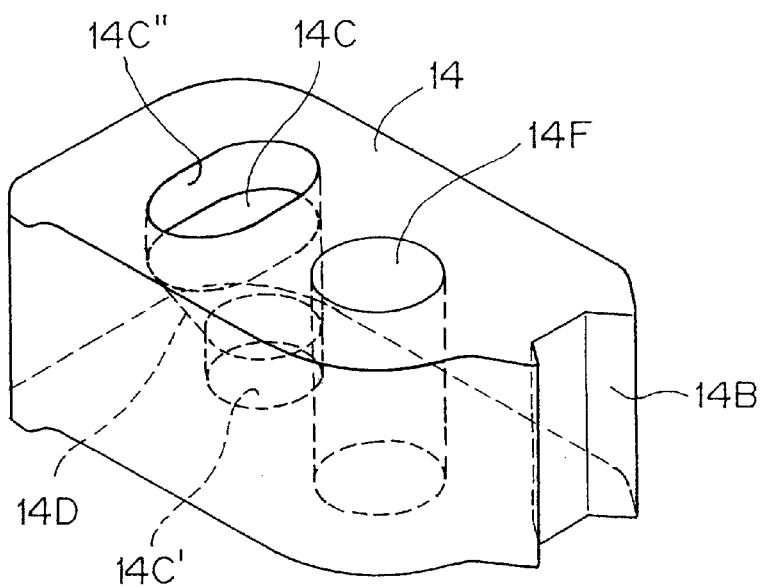
FIG. 7 is a perspective view showing a ratchet pawl according to a second embodiment of the present invention.
Figure 8:
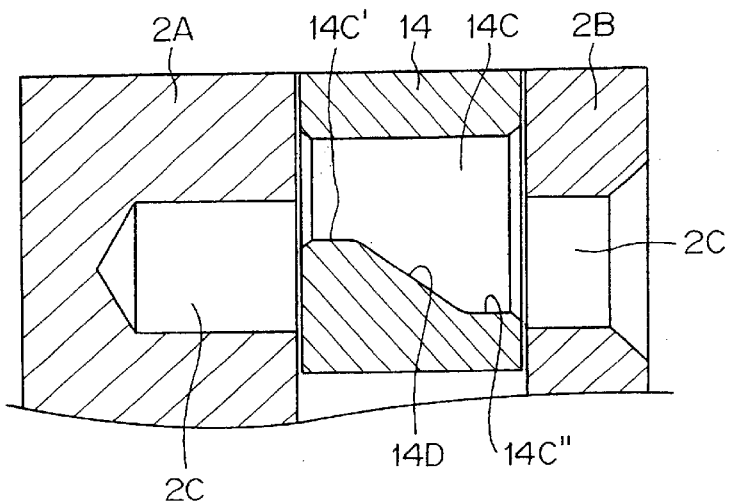
FIG. 8 is a cross-sectional view of a portion of a ratchet tensioner, showing the ratchet pawl of FIG. 7 while the tensioner is in operation.

A second embodiment of the present invention will be described below with reference to FIGS. 7 and 8. These parts which are like or corresponding to those in the first embodiment shown in FIGS. 1–6 are designated by the same reference characters. FIG. 4 is a perspective view showing the structure of a ratchet pawl 14 used as a part of the plunger releasing mechanism. The ratchet pawl 14 has a pivot shaft accommodating hole 14F, a locking pawl 14B at one end on one side of the pivot shaft accommodating hole 14F, and a pin accommodating hole 14C.

The pin accommodating hole 14C differs from the one 4C in the first embodiment shown in FIGS. 1–6 only in that an oblong larger end portion 14C" and a circular smaller end portion 14C' each have a circumferential surface extending parallel to the axis of the pivot shaft accommodating hole 14F. A central portion of the pin accommodating hole 14C is a tapered hole having a sloped surface 14D extending obliquely across the axis of the pin insertion hole 2C formed in the housing 2. The axis of the pin accommodating hole 14C is normally offset from the axis of the pin insertion hole 2C.

The plunger releasing mechanism having the ratchet pawl 14 of the foregoing construction operates as follows. When a pin with a conical tip end (not shown but identical to the pin 9 shown in FIG. 5) is inserted into the pin insertion hole 2C from a first portion formed in a side wall 2B, the tip end of the pin comes in contact with the sloped surface 14D of the pin accommodating hole 14C of the ratchet pawl 14. As the pin is further advanced, the tip end of the pin forces the sloped surface 14D in a forward direction (left-hand direction in FIG. 8). By a horizontal component of the pressure or force applied from the tip end of the pin to the sloped surface 14D, the rack pawl 14 is turned about the axis of a pivot shaft (not shown but identical to the pivot shaft 4A shown in FIG. 1) against the force of a ratchet spring (not shown but identical to the spring 7 shown in FIG. 1). The angular movement of the ratchet pawl 14 causes the locking prong 14B to disengage from a rack tooth (not shown but identical to the tooth 3B shown in FIG. 1) of the plunger. The plunger is thus released and can be displaced in its fully retracted position. The released state of the plunger can be maintained as long as the pin is inserted in the pin insertion hole 2C across the pin accommodating hole 14C.

Figure 9:
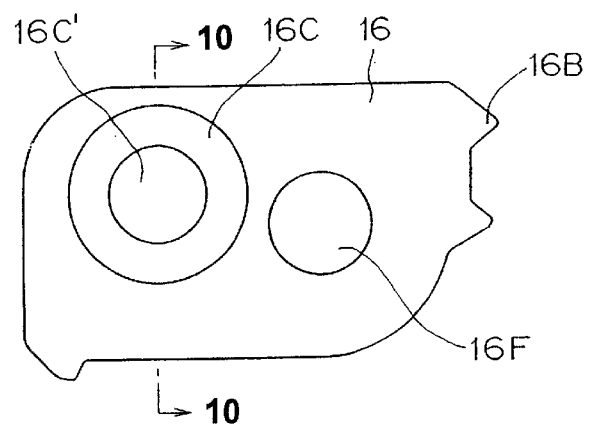
FIG. 9 is a plan view of a ratchet pawl according to a third embodiment of the present invention.
Figure 10:
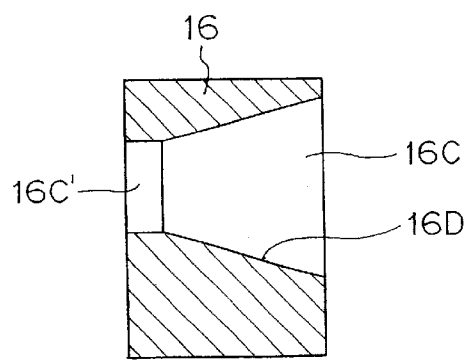
FIG. 10 is a cross-sectional view taken along line X—X of FIG. 9.

A third embodiment of the present invention will be described below with reference to FIGS. 9 and 10. A ratchet pawl 16 used for the plunger releasing mechanism has a pivot shaft accommodating hole 16F, a locking prong 16B at one end located one side of the pivot shaft accommodating hole 16F, and a pin accommodating hole 16C formed on the opposite side from the locking prong 16B with respect to the pivot pin accommodating hole 16F. The pin accommodating hole 16C comprises a circular hole with countersink having a larger end facing a side wall (not shown but identical to the side wall 2B shown in FIG. 5) and a smaller end 16C' facing a side wall (not shown but identical to the side wall 2A shown in FIG. 5). The axis of the pin accommodating hole 16C is normally offset from the axis of a pin insertion hole (not shown but identical to the hole 2C shown in FIG. 5) Part of the inner circumferential surface of the countersink forms a sloped surface 16D extending obliquely across to the axis of the pin insertion hole.

The plunger releasing mechanism having the ratchet pawl 16 of the foregoing construction operates as follows. When a pin with a conical tip end (not shown but identical to the pin 9 shown in FIG. 5) is inserted into the pin insertion hole 2C from the first portion formed in the side wall 2B, the tip end of the pin comes in contact with the sloped surface 16D of the pin accommodating hole 16C of the ratchet pawl 16. As the pin is further advanced, the tip end of the pin forces the sloped surface 16D in a forward direction (left-hand direction in FIG. 10). By a horizontal component of the pressure or force applied from the tip end of the pin to the sloped surface 16D, the rack pawl 16 is turned about the axis of a pivot shaft (not shown but identical to the pivot shaft 4A shown in FIG. 1) against the force of a ratchet spring (not shown but identical to the spring 7 shown in FIG. 1). The angular movement of the ratchet pawl 16 causes the locking prong 16B to disengage from a rack tooth (not shown but identical to the tooth 3B shown in FIG. 1) of the plunger, thereby releasing the plunger. Thus, the plunger can be displaced in its fully retracted position. The released state of the plunger can be maintained as long as the pin is inserted in the pin insertion hole 2C across the pin accommodating hole 16C.

Figure 11:
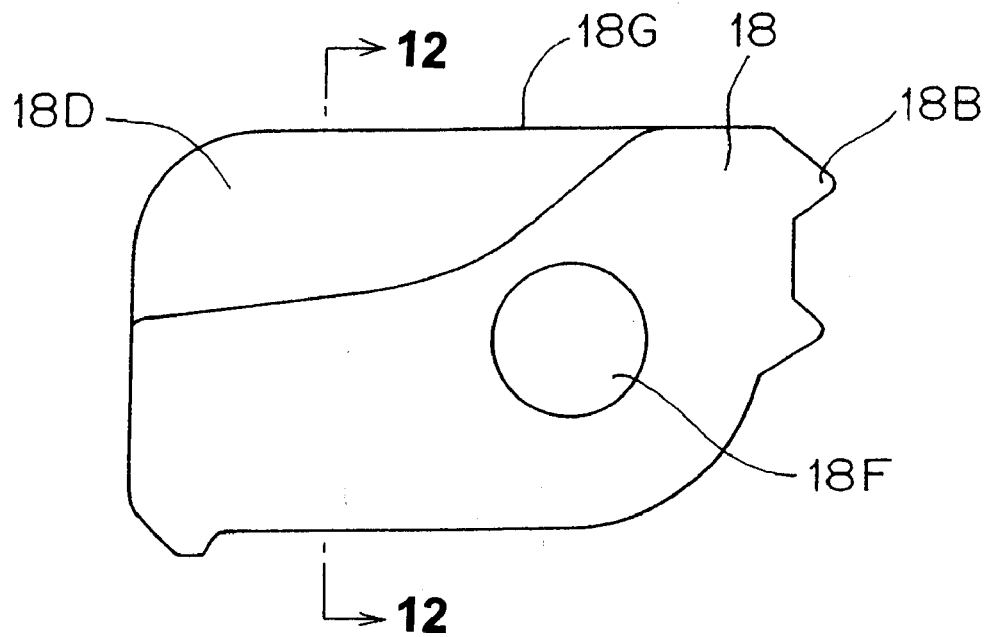
FIG. 11 is a plan view of a ratchet pawl according to a fourth embodiment of the present invention.
Figure 12:
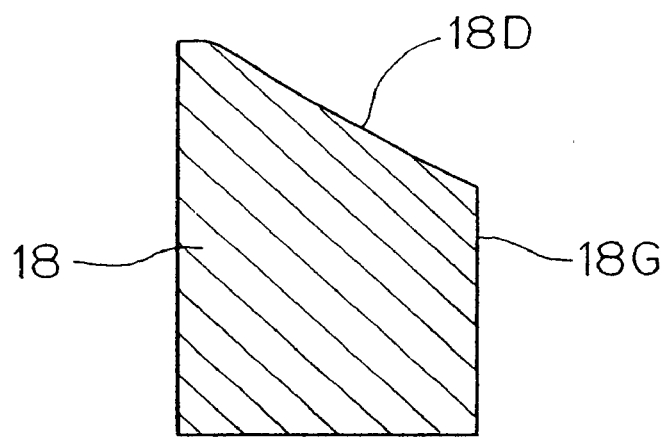
FIG. 12 is a cross-sectional view taken along line XII—XII of FIG. 11.
Figure 13:
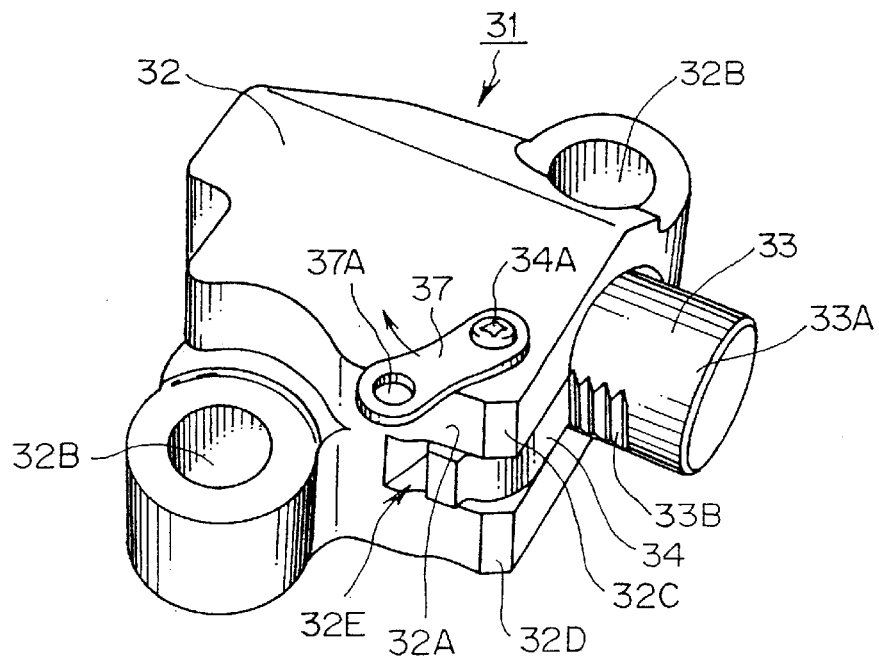
FIG. 13 is a perspective view of a conventional ratchet tensioner.
Figure 14:
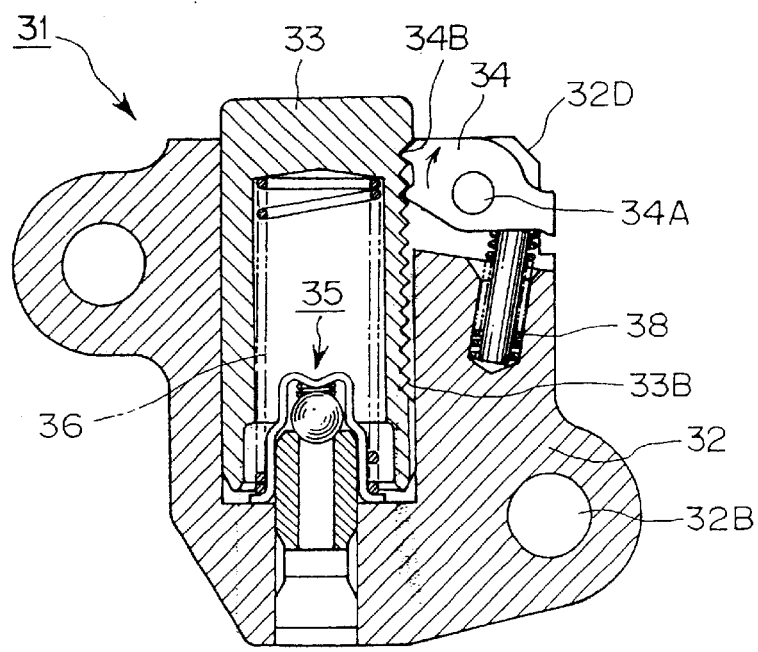
FIG. 14 is a cross-sectional view of the conventional ratchet tensioner.

A fourth embodiment of the present invention will be described with reference to FIGS. 11 and 12. A ratchet pawl 18 used for the plunger releasing mechanism has a pivot shaft accommodating hole 18F, a locking prong 18B at one end located on one side of the pivot shaft accommodating hole 18F, and a beveled or sloped surface 18D formed on the opposite side from the locking prong 18B with respect to the pivot shaft accommodating hole 18F. The sloped surface 18D faces a first aside wall (not shown but identical to the side wall 2B shown in FIG. 5) of the housing and normally extends obliquely across the axis of a pin insertion hole (not shown but identical to the one 2C shown in FIG. 5).

The plunger releasing mechanism having the ratchet pawl 18 of the foregoing construction operates as follows. When a pin with a conical tip end (not shown but identical to the pin 9 shown in FIG. 5) is inserted into the pin insertion hole 2C from the first portion formed in the side wall 2B of the housing 2 (see FIG. 5), the tip end of the pin comes in contact with the sloped surface 18D of the ratchet pawl 18. As the pin is further advanced, the tip end of the pin forces the sloped surface 18D in a forward direction (left-hand direction in FIG. 12). By a horizontal component of the pressure or force applied from the tip end of the pin to the sloped surface 18D, the rack pawl 18 is turned about the axis of a pivot shaft (not shown but identical to the pivot shaft 4A shown in FIG. 1) against the force of a ratchet spring (not shown but identical to the spring 7 shown in FIG. 1). The angular movement of the ratchet pawl 18 causes the locking prong 18B to disengage from a rack tooth (not shown but identical to the tooth 3B shown in FIG. 1) of the plunger, thereby releasing the plunger. Thus, the plunger can be displaced in its fully retracted position. The released state of the plunger can be maintained as long as the pin is inserted in the pin insertion hole 2C with the rear end portion of the ratchet pawl 18 supported on the pin. The sloped surface 18D formed by merely chamfering or beveling an edge portion of the ratchet pawl 18 so that the ratchet pawl 18 is easy to manufacture and can be manufactured at a relatively low cost.

The term "pin" is used herein in comprehensive sense, i.e., to broadly refer to a round pin, a taper pin, rectangular pin, a tip end of a screwdriver, an eyeleteer, or any other pin-like member capable of being inserted in the pin insertion hole 2C and pin accommodating hole 4D, 14C, 16C.

The sloped surfaces 4D, 14D and 16D in the illustrated embodiments are arcuate surfaces. They may be replaced with a flat sloped surface. Although in the illustrated embodiment, the ratchet tensioner is of the hydraulic type in which an oil is supplied from an external pump to a hollow interior space of the plunger and the ratchet has a backlash. The present invention can effectively applied to a backlashless ratchet tensioner.

As described above, the plunger releasing mechanism incorporated in the ratchet tensioner of the present invention has a pin insertion hole formed in a plunger housing transversely across a recessed groove formed in the housing for mounting the ratchet pawl, and a sloped surface formed on the ratchet pawl and normally extending obliquely across the axis of the pin insertion hole. The sloped surface, upon abutment with the tip end of a pin which is inserted in the pin insertion hole, is capable of causing the ratchet pawl to turn against the force of the ratchet spring to thereby disengage the locking prong of the ratchet pawl from the rack tooth of the plunger for releasing the plunger.

Since the plunger can be displace in the released state only by inserting a pin-like member into the pin insertion hole, it becomes possible to apply the tensioner with plunger releasing mechanism to an engine having a small service hole. In such an application, a screwdriver is inserted, as a pin like member, into the pin insertion hole through the service hole of the engine. This will improve the efficiency of the maintenance of the engine.

In addition, the plunger can be maintained in the released state by merely inserting the pin into the pin insertion hole across the recessed groove. Thus, the plunger can readily be manually displaced backward in a fully retracted position to facilitate a work required for the maintenance of the engine or replacement of the chain or belt.

Furthermore, since the ratchet pawl is used to form a part of the plunger releasing mechanism, there is no need for providing a separate part, such as a lever used with the conventional tensionermember. The plunger releasing mechanism does not increase the number of part of the tensioner, can reduce a space required for installation in the engine, and can be manufactured less costly.

Obviously, various minor changes and modifications of the present invention are possible in the light of the above teaching. It is therefore to be understood that within the scope of the appended claims, the present invention may be practiced otherwise than as specifically described.

What is claimed is:

1. A ratchet tensioner comprising:
   a housing having a recessed groove;
   a plunger having an axis reciprocally mounted in the housing with one end of the plunger projecting outward from the housing said plunger having a series of rack teeth formed on an outer circumferential surface along the axis thereof;
   a plunger spring acting between the housing and the plunger and urging the plunger in a direction to project outward from the housing,
   a ratchet pawl and a pivot shaft pivotally mounting the pawl to the housing within said recessed groove formed in the housing, the ratchet pawl having a locking prong at one end thereof located on one side of the pivot shaft;
   a ratchet spring urging the ratchet pawl to turn about the axis of the pivot shaft in one direction so that the locking prong of the ratchet pawl is held in mesh with one of said series of rack teeth; and
   a plunger releasing mechanism for turning the ratchet pawl about the axis of the ratchet shaft in the opposite direction against the force of the plunger spring to disengage the locking prong of the ratchet pawl from the rack tooth of the plunger, the plunger releasing mechanism having
   a pin having a tip end,
   a pin insertion hole formed in the housing transversely across the recessed groove for permitting insertion of the pin from the exterior of the housing, the pin insertion hole being located a given distance from said pivot shaft on the opposite side of the pivot shaft from the locking prong, and
   a sloped surface formed on the ratchet pawl and normally extending obliquely across the axis of the pin insertion hole, the sloped surface, upon abutment with said tip end of the pin which is inserted in the pin insertion hole, being capable of causing the ratchet pawl to turn in said opposite direction against the force of the ratchet spring to thereby disengage the locking prong of the ratchet pawl from the rack tooth of the plunger for releasing the plunger.

2. A ratchet tensioner according to claim 1, wherein the ratchet pawl has a pin accommodating hole formed therein at a distance from said pivot shaft equal to said given distance, said pawl hole in the normal operating mode having an axis spaced from the axis of the pin insertion hole of the housing, the pin accommodating hole having an inner circumferential surface portion extending at an angle to the axis of the pin accommodating hole and forming the sloped surface.

3. A ratchet tensioner according to claim 2, wherein the pin insertion hole is open at least at one end thereof, and the pin accommodating hole comprises a tapered hole having a larger end facing in the same direction as the open end of the pin insertion hole and a smaller end opposite to the larger end, the larger end of the tapered hole having an oblong shape and the smaller end of the tapered hole having a circular shape, the oblong-shaped larger end of the tapered hole and the circular-shaped smaller end of the tapered hole being connected by the sloped surface.

4. A ratchet tensioner according to claim 2, wherein the pin insertion hole is open at least at one end thereof, and the pin accommodating hole comprises a tapered hole having a larger end facing in the same direction as the open end of the pin insertion hole, a smaller end opposite to the larger end, and an intermediate portion disposed between the larger end and the smaller end, the larger end of the tapered hole having an oblong shape and an inner circumferential surface extending parallel to the axis of the tapered hole, the smaller end of the tapered hole having a circular shape and an inner circumferential surface extending parallel to the axis of the tapered hole, the oblong-shaped larger end of the tapered hole and the circular-shaped smaller end of the tapered hole being connected by the sloped surface.

5. A ratchet tensioner according to claim 2, wherein the pin insertion hole is open at least at one end thereof, and the pin accommodating hole comprises a circular hole with countersink having a larger end facing in the same direction as the open end of the pin insertion hole and a smaller end opposite to the larger end, the countersink having an inner circumferential surface partly forming the sloped surface.

6. A ratchet tensioner according to claim 1, wherein the ratchet pawl is beveled at an edge so as to form the sloped surface.

* * * * *